2,971,650

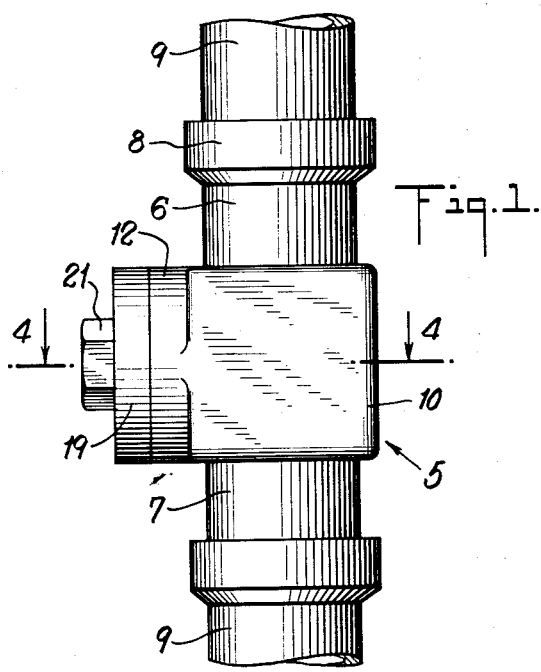
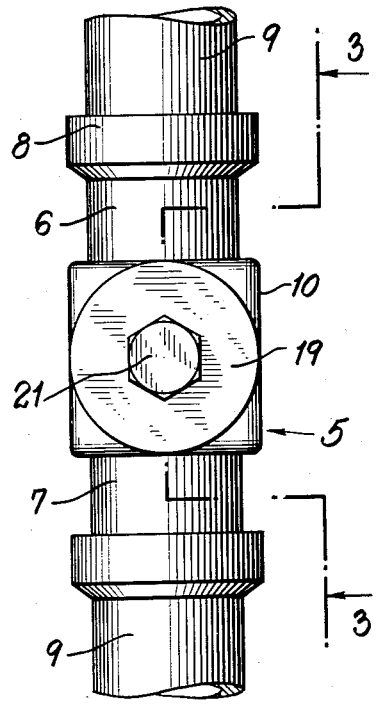
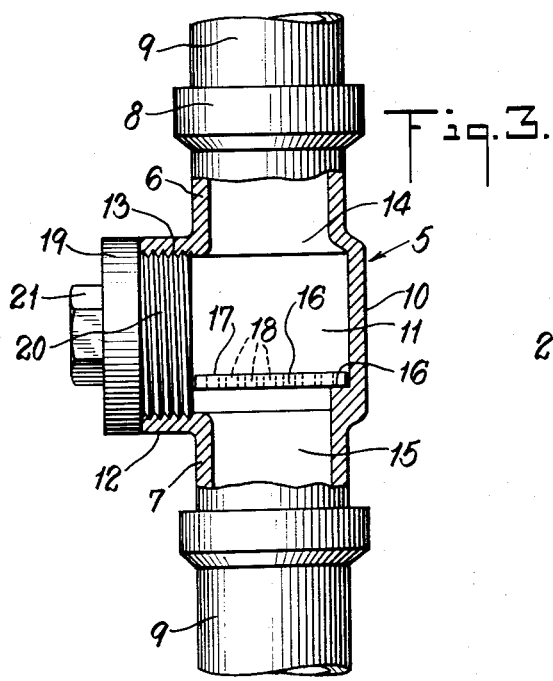
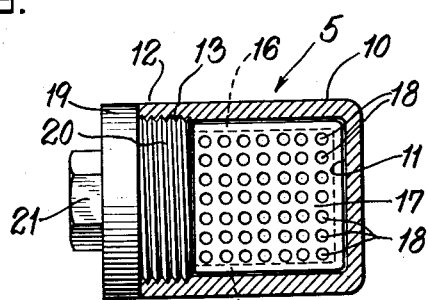
INVENTOR.
WILLIAM MIRANDA
BY James J. Cannon.
ATTORNEY

United States Patent Office 2,971,650
Patented Feb. 14, 1961

TRAP

William Miranda, Preakness, N.J.
(157 Ryerson Ave., Paterson, N.J.)

Filed Sept. 23, 1957, Ser. No. 685,450

1 Claim. (Cl. 210—447)

The present invention relates to traps and more particularly to a trap for use in a drainpipe or leader.

One of the objects of the present invention is to provide a trap for installation within a drainpipe or leader for entrapping debris, for instance, leaves, twigs, trash, paper, and even rubber and baseballs which may be washed or otherwise discharged into the pipe, from the gutter or roof of the building, whereby, to preclude clogging not only of the drainpipe but the sewer line or other drainwater disposal mediums connected thereto.

Another object of the present invention is to provide a trap of the foregoing described character which is equipped with removable straining means for screening the water and retaining thereon the debris for subsequent disposal.

A further object of the present invention is to provide a trap of the foregoing described character having a readily accessible normally closed clean-out opening or flue of a sufficient size, when opened, to permit expeditious removal therethrough of both the debris and straining means for discarding of the debris and cleaning of said means for replacement within the trap.

A still further object of the present invention is to provide a trap of the foregoing described character wherein the straining means is of a size and shape to preclude removal thereof through either the water inlet or outlet ports, thereby, preventing loss of said means from within the trap while the latter is stored or being shipped with the clean-out opening closed.

An important object of the present invention is to provide a trap of the foregoing described character which is simple in construction, easy of installation, durable in use, efficient in operation, and economical in manufacture.

Another important object of my invention is to provide a debris collecting trap having closure means effective for closing and sealing the clean-out opening or flue in a manner to preclude the use of a gasket or the like.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a side elevation of the present invention as installed within a drainpipe or leader;

Figure 2 is a front elevation thereof;

Figure 3 is a detail sectional view taken on the line 3—3 of Figure 2; and

Figure 4 is a transverse section taken of the line 4—4 of Figure 1.

In practicing the present invention, as illustrated in the drawing, the trap 5 is formed with a pair of aligned inlet and outlet sleeves 6 and 7 with the upper end of the inlet sleeve 7 being provided with a collar 8 having fitted and secured therein the lower discharge end of a superjacent section of a drainpipe or leader 9. The lower end of the outlet sleeve 7 is fitted and sealed within the collar formed on the upper end of the subjacent section of the drainpipe 9.

The sleeves 6 and 7 are connected together, in spaced relation, by a substantially square-shaped housing 10 having a chamber 11 and formed on its front face with an interiorly threaded rib or flange 12 defining a clean-out opening or flue 13 communicating with the chamber 11. The bores or passages of the sleeves 6 and 7 communicate with the chamber 11 through their outlet and inlet ports 14 and 15, respectively.

The side and rear walls of the housing 10 are interiorly formed, slightly above the inlet port 15 of the outlet sleeve 7, with a seat or ledge 16 on which is removably seated the side and rear margins of a substantially square-shaped plate 17 formed with a multiplicity of perforations or holes 18, extending downwardly therethrough, and constituting straining means by which debris is removed from water passing through the housing from the inlet sleeve 6 thereabove. The opening or flue 13 is normally closed by a disc-like closure member 19 provided with a threaded shank 20 tightly threaded into the opening 13 for closing and sealing the same against leakage. The outer radial face of the member 19 is provided with a multilateral projection 21 for receiving a tool, for example, a wrench whereby the member 19 may be removed from the flue to permit access to the chamber or threaded therein to close and seal the opening 13.

When the trap 5 is incorporated within the drainpipe or leader 9, and herein disclosed, debris discharged or carried by water into the housing through the port 14 will be retained by and collected upon the plate 17, while the water, by reason of the openings 18, will flow through the housing and out through the port 15, thereby eliminating any clogging below the housing by the debris. By removing the closure member 19, access is had to the housing for removing the debris for discarding and plate 17 for cleaning and replacement.

Inasmuch as the opening 13 is of a slightly larger diameter than the width of the plate 17, the latter may be lifted slightly upwardly from the ledge 16 and withdrawn from the chamber 11 centrally through the opening without difficulty and replaced therein in a reverse manner. Furthermore, because the size of the plate 17, with respect to its length or breadth, is of a greater distance than the diameters of the ports 14 and 15 of the sleeves 6 and 7, the plate will be retained within the housing against loss occasioned by moving, storing or otherwise, so long as the opening or flue 13 remains closed. Moreover, by reason of the shank 20, of the member 19, being tightly threaded into the threaded opening 13, for example, by tapering threads and/or their close tolerances, sealing of the opening or flue 13 is effectively obtained against leakage and the use of a gasket or the like is rendered unnecessary, thereby complying with plumbing codes or the like of various localities which forbid the employment of gaskets in many installations.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claim.

What I claim is:

A drainpipe trap comprising a housing having inlet and outlet ports at the top and bottom, respectively, of said housing and provided with a threaded circular cleanout flue laterally of said ports, said housing having integrally formed therein a three-sided, rectangular, horizontal interior ledge between said ports and opening into said flue, a flat, rectangular strainer plate removably seated on said ledge and extending transversely of said housing for removing and collecting debris from water flowing through said housing from said inlet to said outlet ports and through said plate, a detachable threaded closure member threaded into said flue for closing the latter, said horizontal ledge being located below the horizontal diameter of said circular clean-out flue, the width of said strainer plate being greater than the chord of said cleanout flue in register with said clean-out plate when seated on said ledge the threads of said member and said flue cooperating to seal said flue against leakage of said water from said housing through said flue and with said threads constituting the sole means for effecting said seal, the inner end of said closure member when threaded into said flue being flat and extending substantially into abutting engagement with the unseated edge of said strainer plate to prevent the passage of water and debris around said plate, said plate being of a size and shape to preclude its removal from said housing through said ports, said flue being of a size to permit withdrawal of said plate and collected debris from said housing when said member is removed from said housing.

References Cited in the file of this patent

UNITED STATES PATENTS

| | | |
|---|---|---|
| 182,464 | Mulford | Sept. 19, 1876 |
| 551,044 | Park | Dec. 10, 1895 |
| 586,724 | Edmonds | July 20, 1897 |
| 1,641,938 | Traut | Sept. 6, 1927 |
| 1,817,376 | Izquierdo | Aug. 4, 1931 |
| 2,132,983 | Call | Oct. 11, 1938 |